2,921,535
FLUID TRANSLATING DEVICE

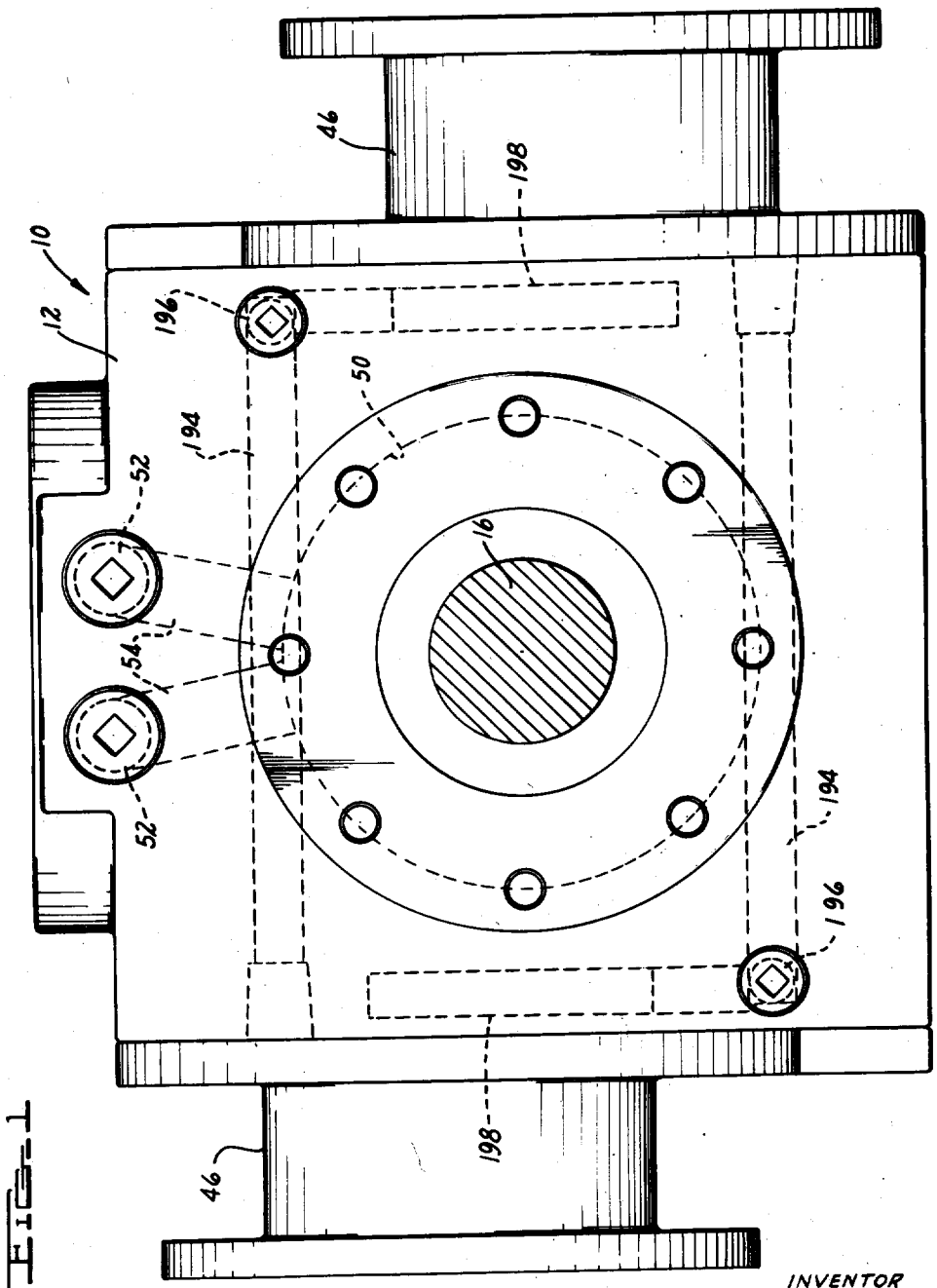

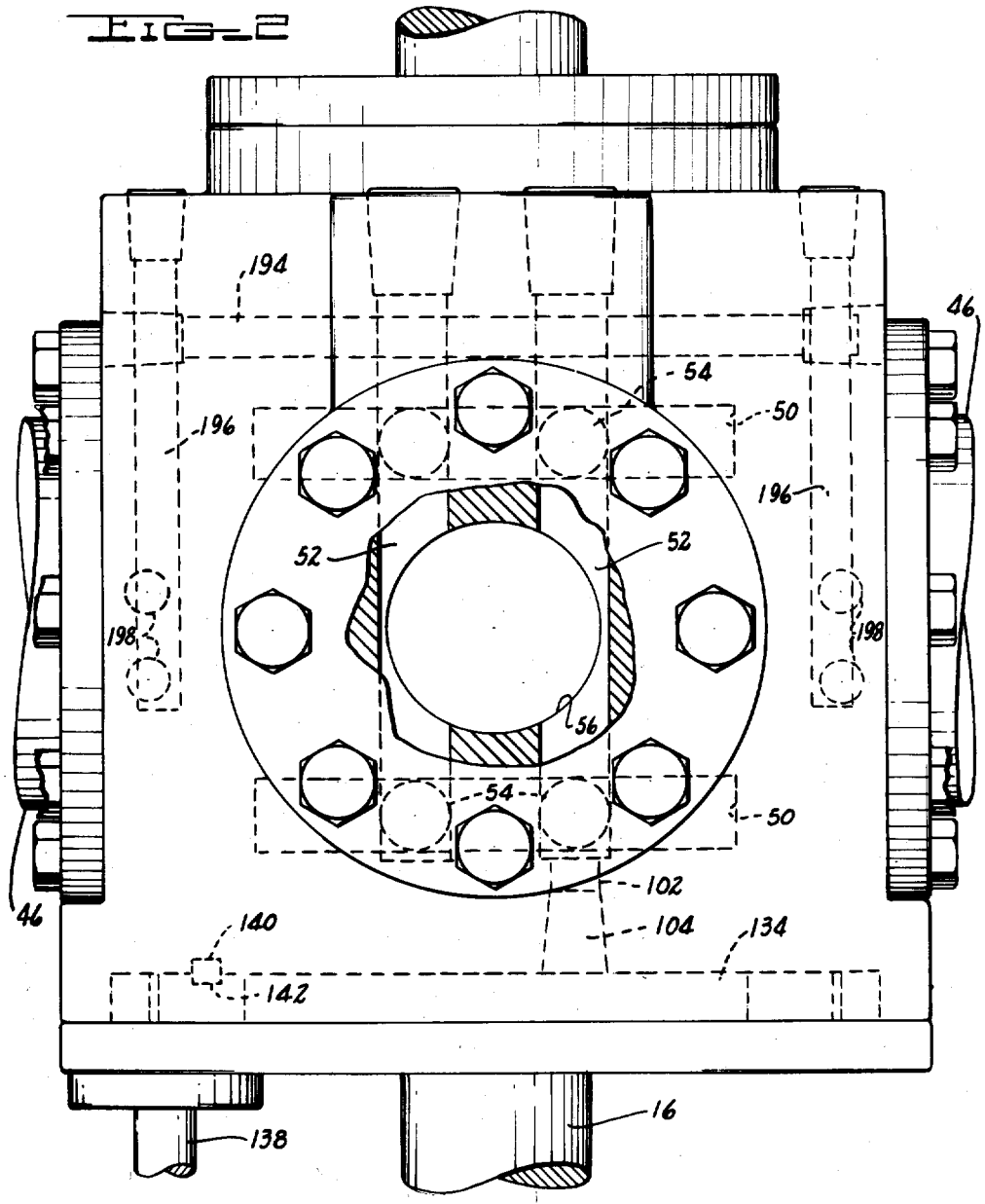

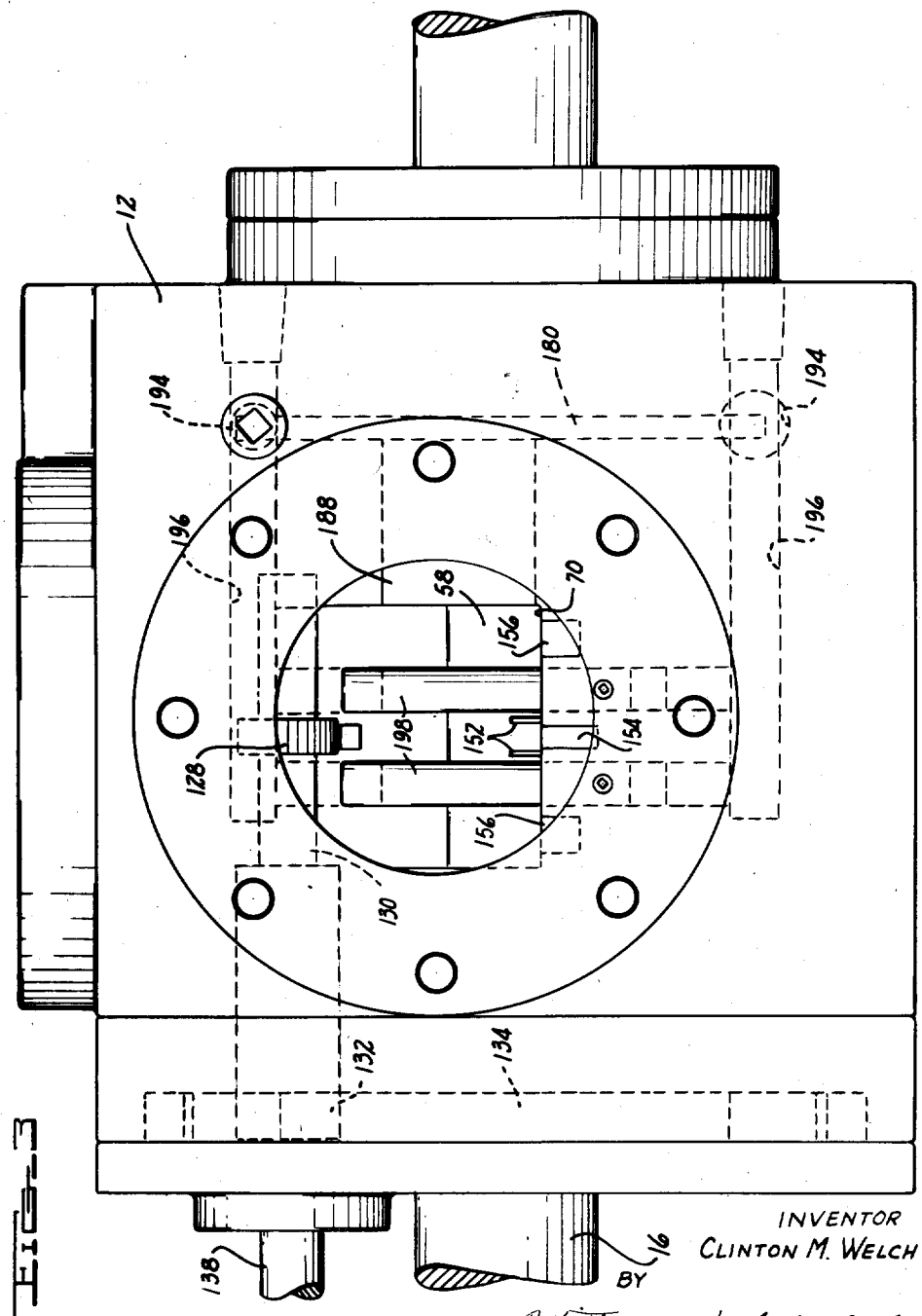

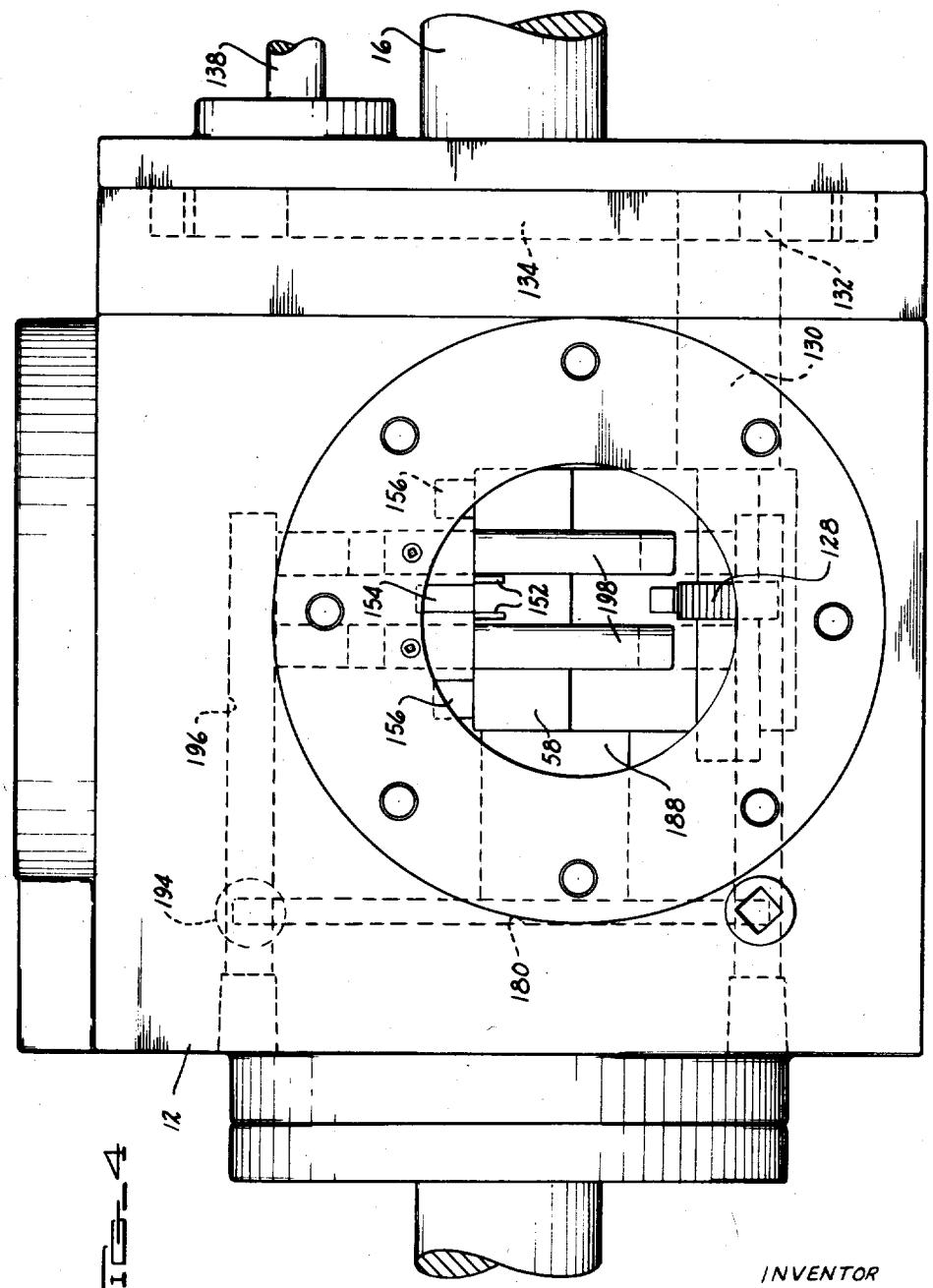

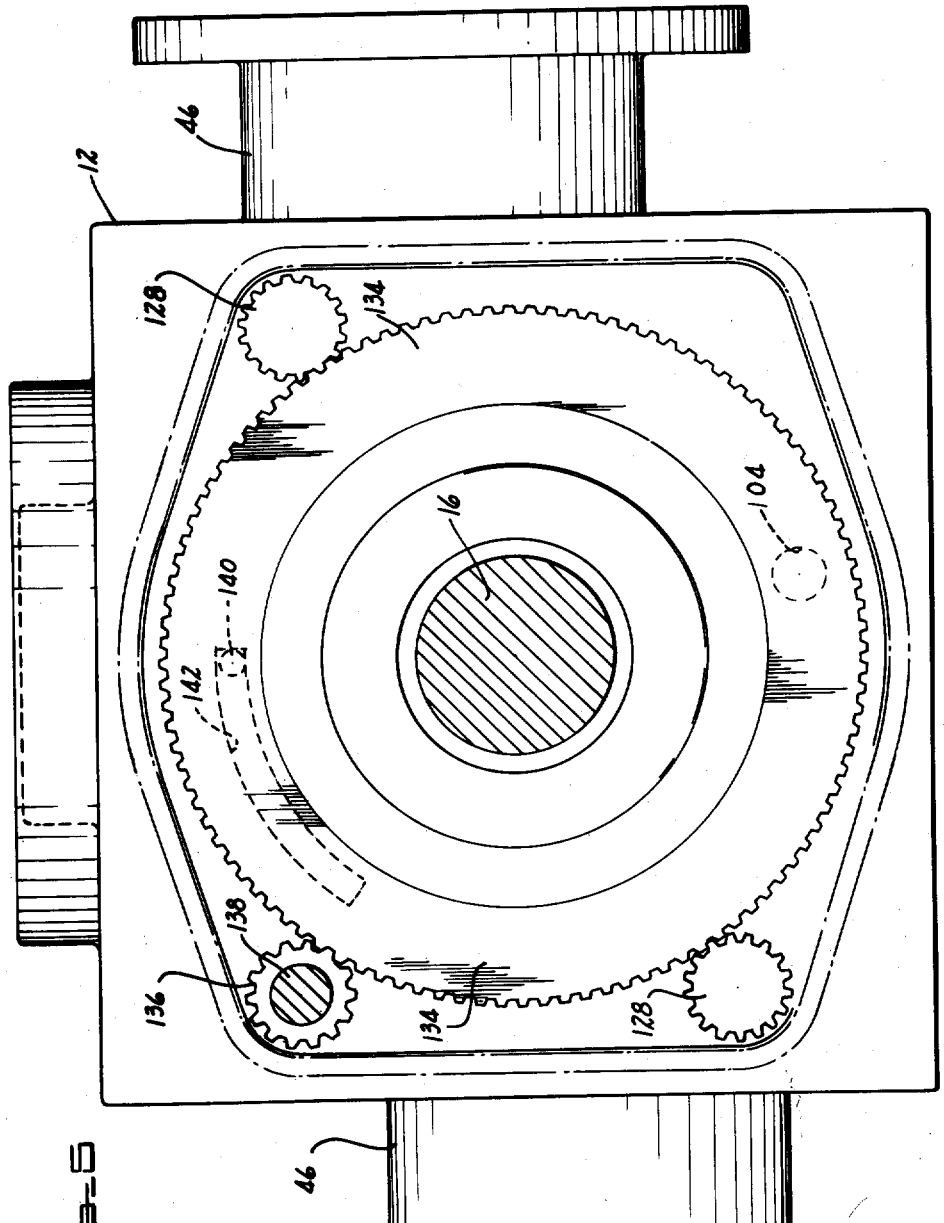

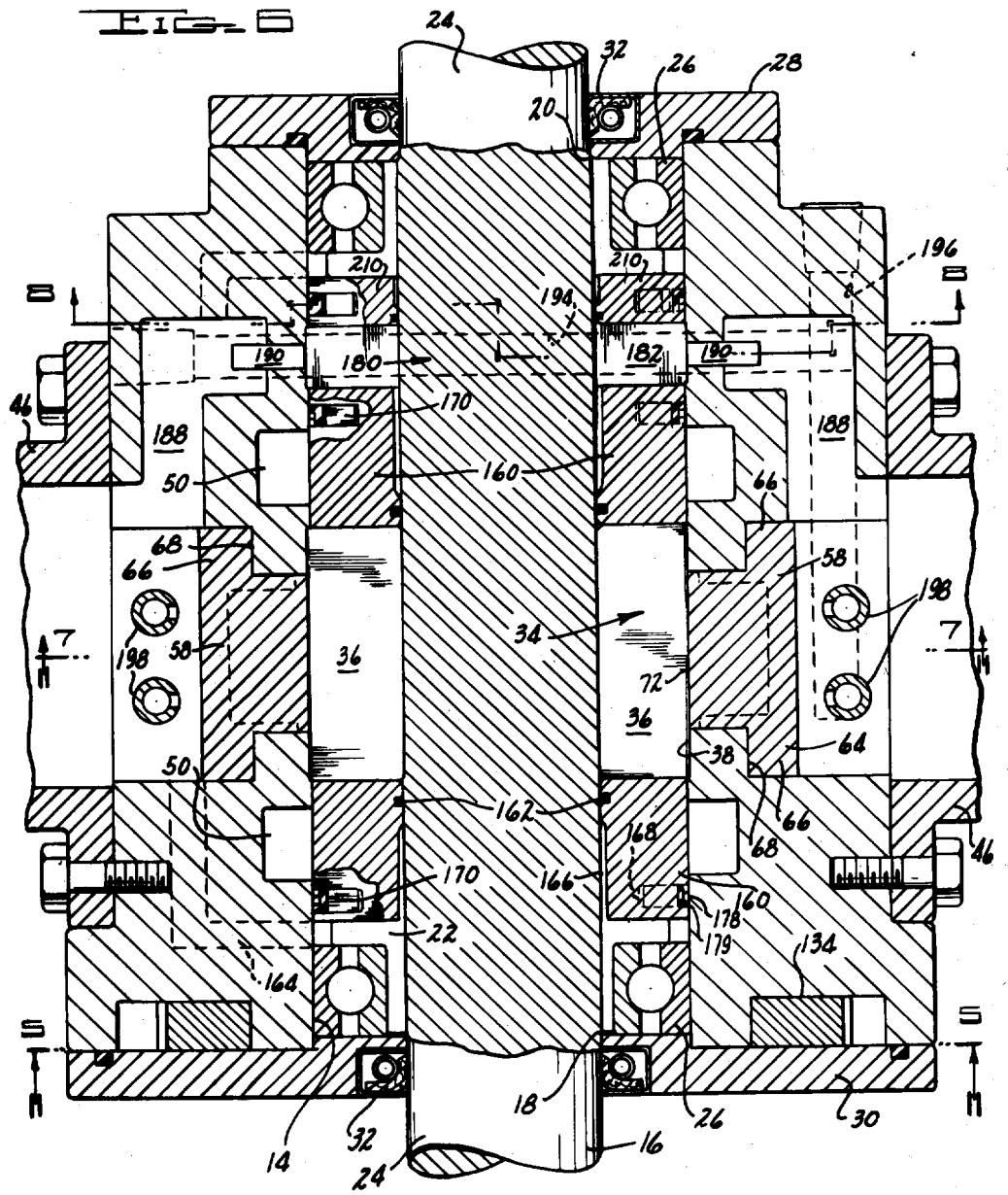

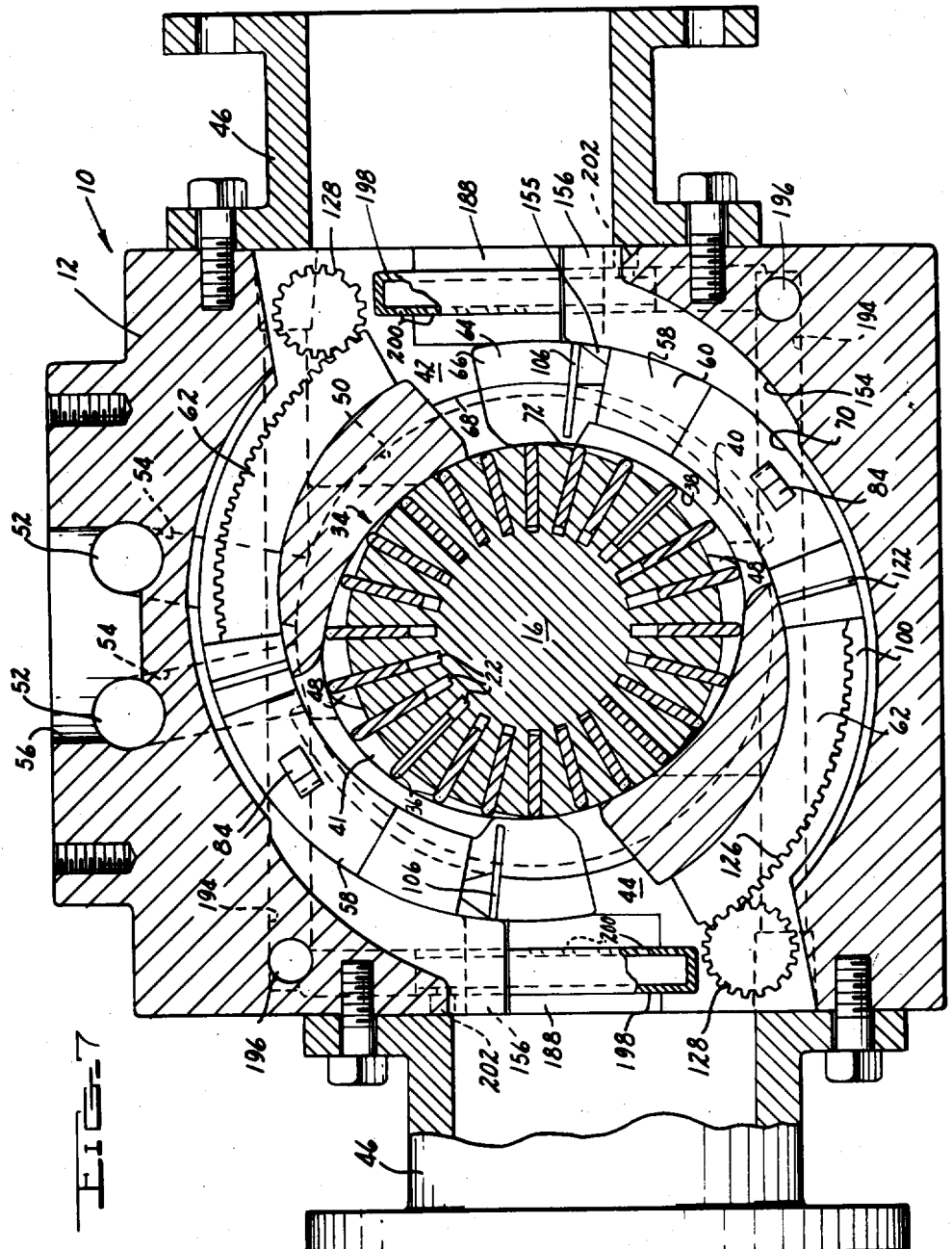

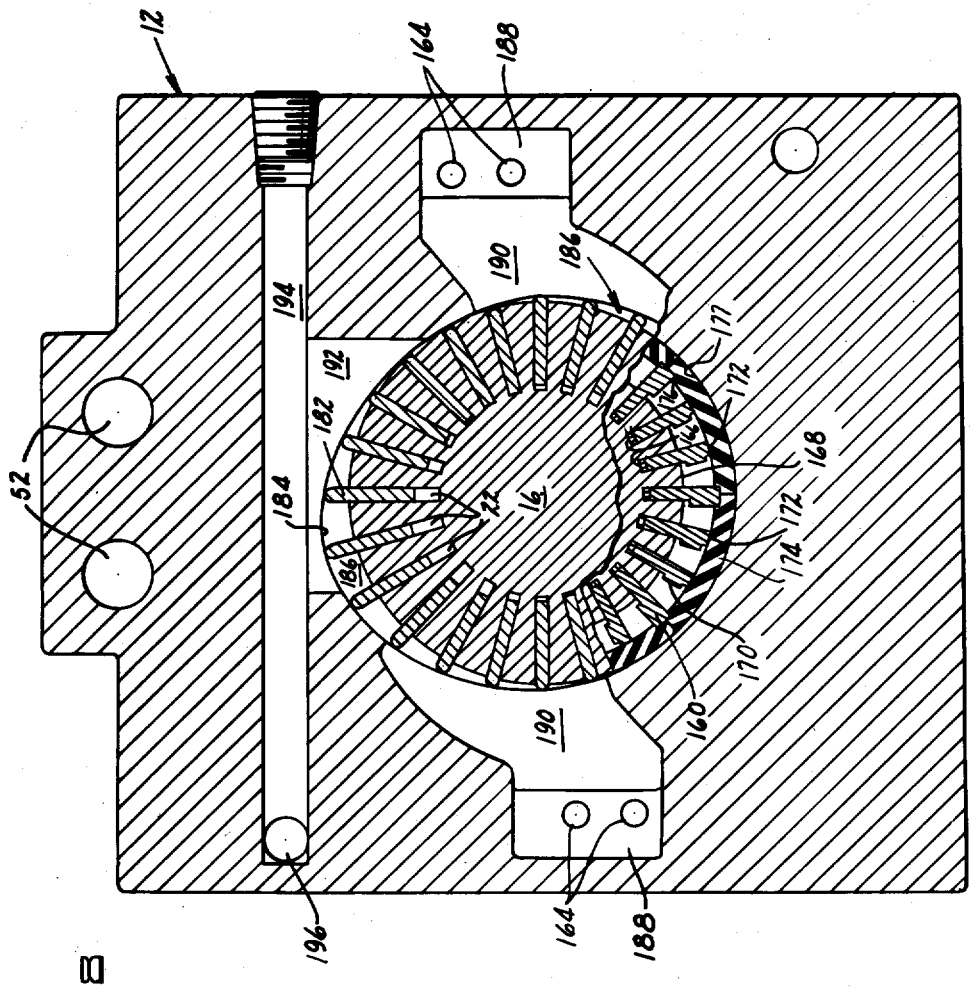

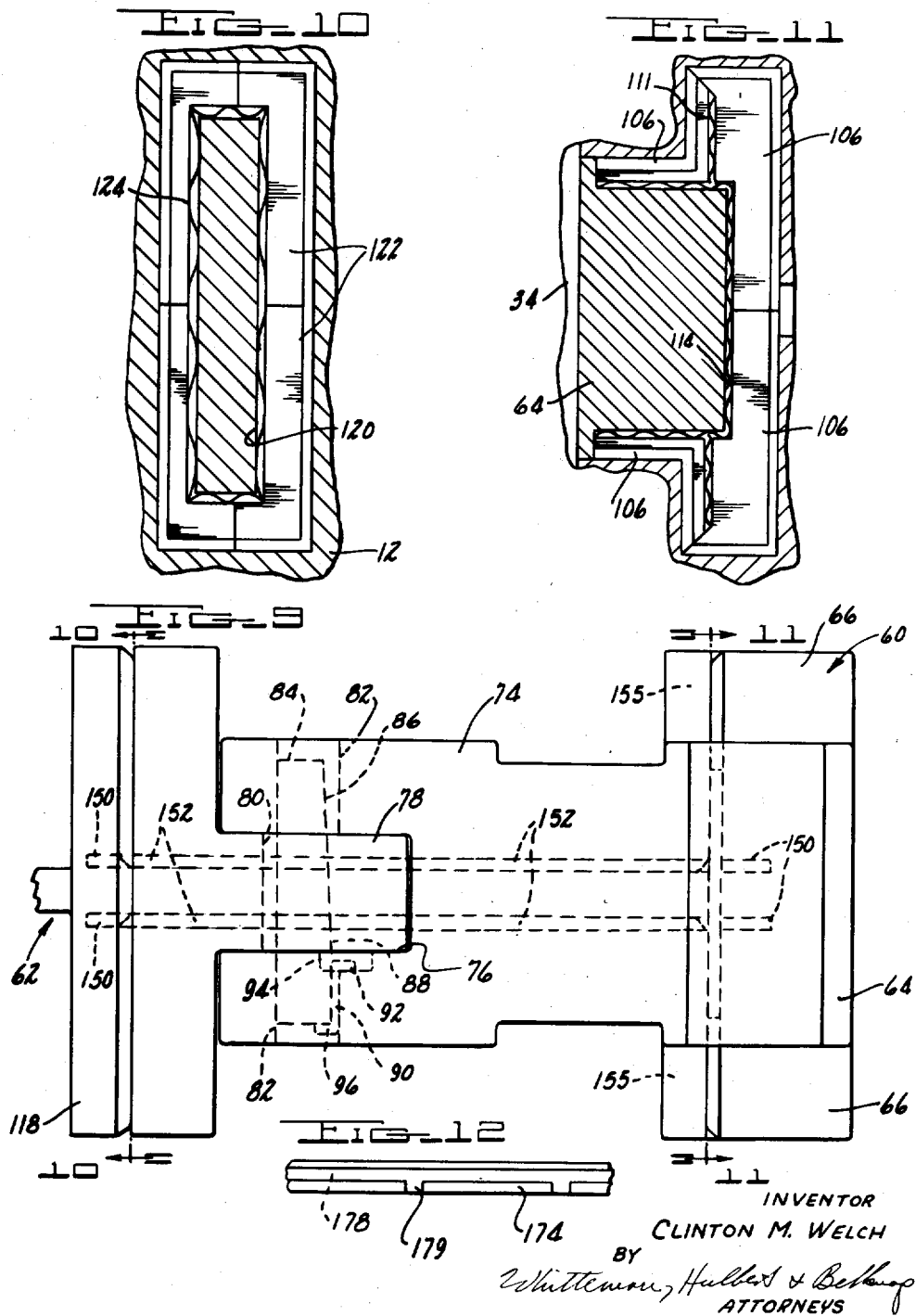

Clinton M. Welch, Sault Sainte Marie, Mich.

Application September 17, 1956, Serial No. 610,114

4 Claims. (Cl. 103—120)

This invention relates to a fluid translating device and refers more particularly to a variable displacement rotary pump or motor unit which may be used in a hydraulic power transmission for a motor vehicle, for example.

One object of this invention is to provide a fluid translating device including a rotor and separate fluid variable displacement chambers surrounding the rotor, in which the chambers are angularly distributed about the rotor in a manner to promote or achieve radial balance of the fluid forces acting on the rotor.

Another object of the invention is to provide a fluid translating device having a rotor, a fluid displacement chamber partly surrounding the rotor provided with inlet and outlet passages and a governor in the chamber for varying the capacity thereof, the governor being constructed and arranged to have surfaces in the chamber exposed to outlet passage pressure tending to approximately balance the governor against movement both radially and circumferentially relative to the rotor.

A further object is to provide a device as described above in which the governor is constructed and arranged to have surfaces in the chamber exposed to inlet passage pressure tending to approximately balance the governor against movement circumferentially relative to the rotor.

Still another object is to provide a fluid displacement device having an improved rotor, and one in which an auxiliary displacement is provided in addition to the main displacement, both units being carried by the improved rotor.

A further object is to provide a fluid displacement device having a rotor, fluid chambers partly surrounding the rotor in angularly spaced relation, inlet passages for said chambers communicating with each other through said chambers, and a governor element in each chamber composed of separable parts respectively insertable into the associated chamber for installation purposes through the inlet passages.

These and other objects of the invention will become more apparent as the following description proceeds, taken in connection with the accompanying drawings, wherein:

Fig. 1 is an elevational view of one end of a fluid displacement device embodying the invention.

Fig. 2 is a top plan, partly in section, of the device shown in Fig. 1.

Fig. 3 is an elevational view looking at one side of the device.

Fig. 4 is an elevational view looking at the opposite side of the device.

Fig. 5 is an elevational view of the opposite end of the device, with the end plate removed, taken along the line 5—5 on Fig. 6.

Fig. 6 is a longitudinal sectional view.

Fig. 7 is a sectional view taken along the line 7—7 on Fig. 6.

Fig. 8 is a sectional view taken substantially along the line 8—8 on Fig. 6.

Fig. 9 is a fragmentary detail of a governor element.

Figs. 10 and 11 are sectional views taken along the lines 10—10 and 11—11 respectively on Fig. 9.

Fig. 12 is an elevational view of a sealing element.

Referring now more particularly to the drawings, the fluid translating device is generally indicated by the reference character 10 and includes a housing 12. The housing has a bore 14 which extends from end to end of the housing, and a rotor 16 is received in the bore for rotation. The enlarged intermediate portion of the rotor between the points 18 and 20 is formed with a plurality of circumferentially spaced longitudinally extending radial grooves or slots 22 and these slots extend entirely from one end to the other of the enlarged intermediate portion of the rotor. The spindle ends 24 of the rotor which extend beyond opposite ends of the intermediate portion extend beyond the ends of the housing to be attached to a suitable source of power if the device is to be used as a pump or to any suitable appliance where the device is used as a motor. For the purposes of the present description, the device will be referred to as a pump.

The rotor 16 is supported within the bore for rotation by bearing assemblies 26 adjacent opposite ends of the housing, the bearing assemblies 26 surrounding the ends of the enlarged intermediate portion of the rotor which are of reduced diameter. End plates 28 and 30 are secured to opposite ends of the housing and are formed with suitable openings for clearing the spindle ends of the rotor. These end plates also carry shaft seals 32 for preventing the escape of fluid from the pump.

The main fluid translating or pumping unit is indicated generally by the reference character 34 and is best seen in Figs. 6 and 7. The main pumping unit comprises a plurality of vanes 36 respectively received in the rotor slots 22 at an intermediate point along the length of the slots. The vanes are supported in the slots for radially in and out sliding movement and normally are urged radially outwardly by the centrifugal force resulting from the rotation of the rotor. The portion of the bore wall which surrounds the vanes provides an annular vane track, indicated at 38, engageable with the outer ends of the vanes to thereby determine the radial position of the vanes during operation of the device. As seen in Fig. 7, this vane track is generally oval shaped, as compared with the circular shape of the slotted portion of the rotor, to provide pumping chambers 40 and 41 at diametrically opposite sides of the rotor.

The pump housing 12 is formed with a pair of inlets 42 and 44 which open into the pumping chambers 40 and 41 respectively. Suitable inlet fittings 46 may be secured to the housing in overlying relation to the inlets for attachment to a suitable source of fluid preferably hydraulic fluid. Each displacement chamber 40 has a pair of axially extending outlet passages 48 which respectively lead to the annular grooves 50 which open into the bore 14 of the housing at opposite sides of the vanes 36. These grooves 50 provide high pressure outlet chambers which connect into the passages 52 through passages 54, the passages 52 communicating directly with the outlet 56 of the device.

Means are provided for varying the amount of fluid displaced by the main pumping unit 34, and such means include governor elements 58 at diametrically opposite sides of the rotor and respectively associated with the pumping chambers 40 and 41. The governor elements 58 are of identical construction. Each includes the separable head and tail parts 60 and 62. The part 60 has a head portion 64 formed with the laterally outwardly extending wings 66 which are suitably guided in the housing to enable the arcuate movement of the governor element above the rotor. The arcuate movement of each governor element is determined by the surfaces 68 in the housing which engage the radially inner surfaces of the wings, and by the surfaces 70 which engage the radially outer surfaces of the governor element. It will be noted that the surfaces 68 and 70 extend along concentric circles, and that the corresponding surfaces of the governor elements and their wings which engage surfaces 68 and 70 are likewise circular to have a smooth sliding engagement. It should also be noted that the vane track 38 from the inlet of the pumping unit to approximately the outlet 48 is likewise circular in outline and concentric with surfaces 68 and 70 so that the governor element 60 moves along the same circular path as the vanes when the governor element 58 is shifted from the position shown adjacent the inlet to a position rotated clockwise in which the head 64 is substantially at the outlet 48. The radially inner surface of the head 64 of each governor element is indicated at 72, and this surface is circular and is engaged by the outer extremities of the vanes and serves to separate the inlet from the outlet of the device in all positions of the governor elements. The pumping device 34 will obviously displace greater amounts of fluid as the governor elements 58 are rotated in a clockwise direction from the position shown.

Referring to Figs. 7, 9, 10 and 11, the governor elements 58 will now be described in detail. The head part 60 of each governor element is of arcuate shape and has a body portion 74 extending from the head portion 64. The end of the body portion 74 remote from the head is formed with a central recess or slot 76 in which is received the tongue 78 of the part 62 of the governor element. The tongue 78 has a transverse opening 80 in general alignment with the aligned transverse openings 82 in the portions of body 74 at opposite sides of the slot 76. A wedge 84 extends through the openings 80 and 82 and has an inclined wedge surface 86 engageable with the correspondingly inclined surface 88 of the opening through tongue 78 so that when the wedge is driven into the position shown in Fig. 9, the tongue 78 is locked tightly within the slot 76. A locking pin 90 is also employed, this pin having a finger 92 at one end which extends at right angles to the body of the pin. The pin is disposed in one of the openings 82 with its finger 92 extending into the recess 94 in the slot 78, the other end 96 of the locking pin being peened over the end of the wedge and cooperating with the finger 92 to prevent the wedge from loosening.

It might be noted at this time that the governor elements are too large to be inserted into the housing in one piece and that is the reason for making them of two separable parts. During installation, one part of a governor element is inserted into position within the housing through one inlet 42 and the other part of the governor element is inserted through the other inlet 44, it being noted that the inlets 42 and 44 communicate with each other through the pumping chambers 38 and the passages 100 which connect the inlet associated with one pumping chamber with the other pumping chamber. By then manipulating the parts 60 and 62 of each governor element, the tongue 78 of one part may be inserted properly within the slot 76 of the other and the wedge and locking pin then inserted through a suitable opening 102 formed in the housing. This opening is normally closed by a plug 104.

The head 64 of each governor element is provided with sealing strips 106. These sealing strips are located within a groove 114 which extends across the bottom of the head up around the wings and part way along the sides. Springs 116 are disposed in the groove between the bottom of the groove and the sealing strips and also extend between the sealing strips themselves to urge the latter in an outward direction and into sealing engagement with the corresponding surfaces within the housing which guide the governor element.

The tail part 62 of each governor element has a head portion 118 to the rear of the tongue 78 which is formed with a peripheral groove 120 having the sealing strips 122 located in the groove and urged outwardly by the springs 124 located at the bottom of the groove. The tail part 62 is of the same arcuate shape as the part 60 and each tail part has rack teeth 126 along the radially outer surface meshing with the pinion 128. Pinions 128 are carried by shafts 130 which have pinions 132 on the opposite ends meshing with a ring gear 134 supported in an annular groove or recess in one end of the housing surrounding the bore and closed by the end plate 30. The ring gear is driven in opposite directions in any suitable manner as by the pinion 136 carried by shaft 138. A pin 140 secured to the housing projects into the groove supporting the ring gear and into an arcuate elongated recess 142 in the ring gear to limit the rotation of the ring gear in opposite directions in accordance with the length of the recess. In the present instance, the ring gear is capable of approximately 52 degrees of angular movement which will afford about 45 degrees of angular movement of the governor elements. The governor elements are shown in Fig. 7 in their limit of counter clockwise movement in which the fluid displaced by the main unit 34 is at a minimum.

With further reference to the governor elements shown especially in Figs. 9 to 11, it will be noted that the cross-sectional area of the governor element at the seals 106 and 122 or along the line of 11—11 on Fig. 9 is substantially equal to the area of the governor element along the line 10—10 on Fig. 9. Accordingly, the pressure of the fluid in the displacement chamber 38 which acts on the governor element does not tend to turn the governor element in either direction angularly with respect to the rotor. The design of the governor elements so that they have surfaces exposed to the fluid pressure in the pumping chambers 38 tending to approximately balance the governor element against movement angularly about the rotor is very important from the standpoint of efficient operation and control of the device. The rotor inlet fluid pressure acts on opposite ends of each governor element against areas equal to that bounded by the seals 106 and 122, such areas being shown by the Figures 10 and 11, and since such areas are equal the inlet pressure which acts on the rotor does not tend to turn the governor elements angularly in either direction relative to the rotor.

The governor elements are also designed to provide radial balance. That is, the surfaces of the governor element exposed to the relatively high pressure in the pumping chamber 38 are arranged and designed so as to approximately balance the rotor in a radial direction. In other words, the radially inner surface area of the governor elements between the seals 106 and 122 is approximately equal to the radially outer surface area. This equality of surfaces does not come about naturally since the radially outer surface of a curved article will normally be greater than the radially inner surface. In order to equalize the surfaces thus exposed to pumping chamber pressure, the radially outer surface of each governor element is in effect reduced in area to that of the radially inner surface. This is accomplished by forming a pair of laterally spaced parallel grooves 150 in the radially outer surface of the part 60 and also of the part 62, the grooves in the respective parts extending in continuation of one another and each containing a seal 152 which has a sealing engagement with the arcuate surface 70 supporting the radially outer surface of the governor element. The adjacent ends of each pair of seals abut one another. Between these parallel seals 152 the arcuate wall 70 in the housing is formed with a groove or channel 154 which extends throughout the entire length of the surface 70 and is open at the opposite ends for communication with both inlet ports 42 and 44. Hence, the area of the governor element between the seals 152 is not subjected to pumping chamber pressure but is open to inlet pressure. The spacing between the seals is predetermined so that the effective area of the axially outer surface of the governor element exposed to pumping chamber pressure is approximately equal to the area of the radially inner surface thereof. It is to be understood of course that the pumping chamber fluid will work its way around each governor element and be applied against the radially outer surface laterally outwardly of the seals.

When the governor elements are in the position shown, the relief clearances 155 in the wings 66 by-pass high pressure fluid in the pumping chambers back to the inlet by way of slots 156 in the housing. Thus the unit will not pump until the governor elements are rotated far enough counterclockwise to move clearances 155 out of register with slots 156.

Referring now to Figs. 6 and 8, sealing elements 160 are carried in the slots 22 of the rotor at opposite ends of the vanes 36, and the elements 160 are tightly received in the slots to prevent the escape of fluid axially along the rotor. These sealing elements each have a rubber seal 162 in a notch at the radially inner edge for engagement with the bottom of the associated slot 22. However, should any fluid from the unit 34 escape past the seals 162, such fluid may pass to drain channels 164 via the grooves 166 at the bottom of the sealing elements 160 and through the drain channels to the inlet of the pump. The high pressure chambers 50 which surround the sealing elements 160 urge them inwardly to produce a more effective seal between seal 162 and the bottom of the slots 22.

The rotor is formed with a pair of axially spaced circumferentially extending grooves 168 in the slotted portion of the rotor. Actually the effect is to notch the rotor between the vane slots rather than to provide a continuous groove. The grooves or notches 168 are provided to receive locking projections 170 on the sealing elements which permit the sealing elements to be inserted into and withdrawn from the rotor slots but prevent axial movement of the sealing elements. The sealing elements are formed with the notches 172 in their radially outer surface immediately outwardly of the keys 170, these notches of course being in circumferential alignment with the deeper notches 168 in the rotor. Arcuate sealing elements of rubber or the like indicated at 174 extend within the adjacent notches 168 and 172. It will be noted in Fig. 8 that every fourth sealing element has a notch 172 of lesser depth to provide an abutment engageable in a recess 176 in the adjacent end of a sealing strip 174 to prevent the sealing strip from shifting circumferentially. The sealing strips 174 are arranged end to end in abutting relation, one strip between every four vanes. These segments 174 as well as the radially outer surfaces of the sealing elements 160 engage the cylindrical portion 177 of the bore through the housing to seal the bore against the axial escape of fluid from the main pumping unit 34. The radial, axially inner edges of the sealing elements 160 provide guiding surfaces for the in and out movement of vanes 36. The strips 174 have circumferential grooves 178 in their radially outer surfaces and transverse notches 179 connect into the grooves at spaced intervals to permit partial balancing of the strips radially, that is relatively high pressure fluid from the high pressure chambers 50 will fill the grooves and urge the strips radially inwardly opposing the normal centrifugal force during rotation of the rotor.

An auxiliary pumping unit is provided, indicated at 180. This auxiliary pumping unit includes vanes 182 respectively disposed in the rotor slots 22 beyond the sealing elements 160 at one end of the main pumping unit. The vanes are slidable radially inwardly and outwardly in the slots, being normally urged outwardly by centrifugal force into engagement with the oval-shaped wall 184 of the bore which serves as a vane track. The auxiliary unit has the diametrically opposed displacement chambers 186 which respectively communicate with the inlet ports 42 and 44 by way of the connecting passages 188 and the inlets 190. The outlets 192 for each pumping chamber 186 communicate with passages 194 which in turn communicate with passages 196. The latter passages 196 open into the jet tubes 198, a pair of which are located in each inlet passage 42 and 44. These jet tubes have spaced jet openings 200 which open towards the vanes of the main unit 34 to deliver inlet fluid to the main unit under a predetermined initial pressure. Thus the provision of an auxiliary pump is for the purpose of pressurizing the inlet fluid to the main pump. Jet tube pins 202 are supported in the housing and connected to the jet tubes to support the latter in position.

As a result of this construction, the inlet fluid to the main unit is partially siphoned off to the auxiliary unit which places it under an initial pressure and then delivers it back to the inlets 42 and 44.

The sealing elements 210 beyond the auxiliary pump vanes are identical with the previously described except they are somewhat shorter. The adjacent radial edges of the sealing elements 210 and 160 guide the in and out movement of the auxiliary vanes.

What I claim as my invention is:

1. In a fluid translating device, a rotor having vanes movable toward and away from the rotational axis of said rotor in response to rotation of said rotor, means providing fluid chambers each extending circumferentially partly about said rotor through which said vanes move upon rotation of said rotor, said fluid chambers being angularly arranged about said rotor, means providing a fluid inlet passage for each chamber, means providing a fluid outlet passage for each chamber spaced circumferentially from the fluid inlet passage therefor, an element in each of said chambers providing governing means, each element partly surrounding said rotor and movable relative to said rotor in opposite circumferential directions about said rotor, means responsive to circumferential movement of each element in the direction of rotation of said rotor to shift said element in a direction away from the axis of rotation of said rotor and responsive to movement of said element in the opposite circumferential direction about said rotor to shift said element toward the axis of rotation of said rotor to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor.

2. In a fluid translating device, a rotor having vanes movable toward and away from the rotational axis of said rotor in response to rotation of said rotor, means providing circumferentially spaced fluid chambers, each extending circumferentially partly about said rotor through which said vanes move upon rotation of said rotor, means providing a fluid inlet passage for each chamber, means providing a fluid outlet passage for each chamber spaced circumferentially from the fluid inlet passage therefor, an element in each chamber providing governing means, each element partly surrounding said rotor and movable relative to said rotor in opposite circumferential directions about said rotor, means responsive to circumferential movement of each element in the direction of rotation of said rotor to shift said element in a direction away from the axis of rotation of said rotor and responsive to movement of said element in the opposite circumferential direction about said rotor to shift said element toward the axis of rotation of said rotor to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor, said inlet passages and said outlet passages in said fluid chambers being spaced apart circumferentially in a manner to approximately balance the radial forces acting on said rotor by the fluid pressure in said passages.

3. In a fluid translating device, a housing having a bore, a rotor closely received in said bore and having vanes movable toward and away from the rotational axis of said rotor in response to rotation of said rotor, said housing being formed to provide diametrically opposite fluid chambers each extending circumferentially partly about said rotor, through which said vanes move upon rotation of said rotor, a fluid inlet passage in said housing for each chamber, said inlet passages communicating with each other through said chambers, a fluid outlet passage in said housing for each chamber spaced circumferentially from said fluid inlet passage, an element in each chamber composed of at least two separable parts and providing governing means movable in opposite circumferential directions about said rotor, means responsive to circumferential movement of each element in the direction of rotation of said rotor to shift said element in a direction away from the axis of rotation of said rotor and responsive to movement of said element in the opposite circumferential direction about said rotor to shift said element toward the axis of rotation of said rotor to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor, each element being installed in said device by inserting one part thereof into the associated chamber through one inlet passage and inserting another part thereof into the latter chamber through the other inlet passage, and means for releasably locking said parts together accessible through an opening in said housing, a closure for said opening, and sealing means carried by said elements sealing said inlet passages from said outlet passages.

4. In a fluid translating device, a rotor having vanes movable toward and away from the rotational axis of said rotor in response to rotation of said rotor, means providing circumferentially spaced fluid chambers each extending circumferentially partly about said rotor through which said vanes move upon rotation of said rotor, means providing a fluid inlet passage for each chamber, means providing a fluid outlet passage for each chamber spaced circumferentially from the fluid inlet passage thereof, means providing a track for guiding the movement of said vanes toward and away from the rotational axis of said rotor, said track having a portion in the region of each chamber which is circular and extends from the fluid inlet passage thereof toward the fluid outlet passage thereof, an element in said chamber providing governing means movable in opposite circumferential directions about said rotor, means responsive to circumferential movement of said element in the direction of rotation of said rotor to shift said element in a direction away from the axis of rotation of said rotor and responsive to movement of said element in the opposite circumferential direction about said rotor to shift said element toward the axis of rotation of said rotor to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor, and a circular guide track for each element substantially co-extensive with the circular portion of said first-mentioned track for engaging and guiding the movement of said element in opposite circumferential directions about said rotor.

References Cited in the file of this patent

UNITED STATES PATENTS

| Re. 24,064 | Welch | Sept. 20, 1955 |
|---|---|---|
| 35,388 | Pierce | May 27, 1862 |
| 283,377 | Comstock | Aug. 21, 1883 |
| 953,539 | Mendizabal | Mar. 29, 1910 |
| 2,141,171 | Centervall | Dec. 27, 1938 |
| 2,166,423 | Clark | July 18, 1939 |
| 2,206,384 | Adler | July 2, 1940 |
| 2,256,459 | Kendrick | Sept. 16, 1941 |
| 2,302,411 | Behrens | Nov. 17, 1942 |
| 2,371,922 | Saito | Mar. 20, 1945 |
| 2,426,491 | Dillon | Aug. 26, 1947 |
| 2,433,484 | Roth | Dec. 30, 1947 |
| 2,490,115 | Clarke | Dec. 6, 1949 |
| 2,570,411 | Vickers | Oct. 9, 1951 |
| 2,642,802 | Gardiner | June 23, 1953 |
| 2,649,739 | Hufferd et al. | Aug. 25, 1953 |
| 2,653,550 | Gardiner et al. | Sept. 29, 1953 |
| 2,656,796 | Garner et al. | Oct. 27, 1953 |
| 2,685,842 | Hufferd | Aug. 10, 1954 |
| 2,811,926 | Robinson | Nov. 5, 1957 |
| 2,876,705 | Aspelin et al. | Mar. 10, 1959 |

FOREIGN PATENTS

| 1,127,162 | France | Aug. 6, 1956 |